(12) United States Patent
Maddi Reddy et al.

(10) Patent No.: US 11,685,366 B2
(45) Date of Patent: Jun. 27, 2023

(54) ELECTRIFIED VEHICLE PERFORMANCE MODE WITH INTENTIONAL WHEEL SPIN FOR TIRE HEATING

(71) Applicant: FORD GLOBAL TECHNOLOGIES, LLC, Dearborn, MI (US)

(72) Inventors: Nithesh Maddi Reddy, Canton, MI (US); Neil Hurst, Livonia, MI (US)

(73) Assignee: FORD GLOBAL TECHNOLOGIES, LLC, Dearborn, MI (US)

( * ) Notice: Subject to any disclaimer, the term of this patent is extended or adjusted under 35 U.S.C. 154(b) by 0 days.

(21) Appl. No.: 17/461,204

(22) Filed: Aug. 30, 2021

(65) Prior Publication Data
US 2023/0063054 A1    Mar. 2, 2023

(51) Int. Cl.
*B60W 30/02*        (2012.01)
*B60W 50/14*        (2020.01)
*B60W 10/192*       (2012.01)
*B60W 10/08*        (2006.01)

(52) U.S. Cl.
CPC ............ *B60W 30/02* (2013.01); *B60W 10/08* (2013.01); *B60W 10/192* (2013.01); *B60W 50/14* (2013.01); *B60W 2050/146* (2013.01); *B60W 2540/10* (2013.01); *B60W 2540/12* (2013.01); *B60W 2710/083* (2013.01); *B60W 2710/18* (2013.01)

(58) Field of Classification Search
CPC ......... B60W 30/02; B60W 10/08; B60T 8/17; B60T 8/1701; B60T 8/172; B60T 8/1769; B60T 8/26; B60S 1/68; B60C 99/003
See application file for complete search history.

(56) References Cited

U.S. PATENT DOCUMENTS

| | | | |
|---|---|---|---|
| 6,406,103 B1* | 6/2002 | Elliott | B60T 8/26 303/20 |
| 7,853,389 B2 | 12/2010 | Luehrsen et al. | |
| 8,244,445 B2 | 8/2012 | Luehrsen et al. | |
| 2011/0175438 A1 | 7/2011 | Mlynarczyk et al. | |
| 2017/0190228 A1* | 7/2017 | Handzel, Jr. | B60W 30/02 |
| 2018/0194340 A1* | 7/2018 | Collins | B60T 8/26 |

(Continued)

OTHER PUBLICATIONS

Torque Vectoring for Electric Vehicles with Individually Controlled Motors: State-of-the-Art and Future Developments, by De Novellis et al. World Electric Vehicle Journal vol. 5—ISSN 2032-6653—© 2012 WEVA; pp. 0617-0628.

*Primary Examiner* — Sizo B Vilakazi
(74) *Attorney, Agent, or Firm* — Brooks Kushman PC; David Kelley

(57) ABSTRACT

An electrified vehicle includes a controller programmed to implement performance mode control of first and second electric machines and wheel brakes associated with wheels of respective first and second axles to provide a braking force to a first axle while providing torque to the second axle to intentionally spin the tires of the second axle to provide a peelout and associated heating or smoking of the tires to improve traction and provide a visual display of power. The maneuver may be repeated for the first axle by providing torque to the first axle while applying braking force to the second axle. A sequential maneuver that spins tires of the first axle followed by tires of the second axle may be performed by specified manipulation of the brake pedal and accelerator pedal.

20 Claims, 3 Drawing Sheets

(56) References Cited

U.S. PATENT DOCUMENTS

| | | | |
|---|---|---|---|
| 2019/0255895 A1* | 8/2019 | Sanborn | B60T 13/686 |
| 2020/0122534 A1* | 4/2020 | Glugla | B60T 8/172 |
| 2021/0094543 A1 | 4/2021 | Barone et al. | |
| 2021/0253069 A1* | 8/2021 | Thompson | B60S 1/68 |
| 2022/0097674 A1* | 3/2022 | Frick | B60W 40/09 |
| 2022/0289196 A1* | 9/2022 | Pettersson | B60W 10/184 |

* cited by examiner

ELECTRIFIED VEHICLE PERFORMANCE MODE WITH INTENTIONAL WHEEL SPIN FOR TIRE HEATING

TECHNICAL FIELD

This disclosure generally relates to a system and method for controlling an electrified vehicle in a performance mode to provide intentional wheel spin to heat the vehicle tires.

BACKGROUND

Vehicles often provide a traction control feature to limit wheel slip or wheel spin by redistributing torque to non-slipping wheels. Some vehicles provide the ability to, at least temporarily, disable traction control via a push button or other human-machine interface (HMI) input. When traction control is intentionally or otherwise disabled, these vehicles typically do not control or otherwise limit wheel slip/spin. Even when traction control is disabled, all-wheel drive vehicles may attempt to equally distribute torque among all four wheels to reduce or eliminate wheel slip/spin. Wheel spin may be desirable for various performance vehicles to heat the tires and improve traction and/or provide a visual exhibition of smoking tires in a "peelout" or "burnout" on a closed course, race track, or similar closed course special situation or event, for example.

SUMMARY

In some configurations, an electrified vehicle includes a first electric machine configured to provide torque to wheels of at least a first axle, an energy store coupled to the first electric machine, wheel brakes associated with the wheels of the first axle and wheels of a second axle, and a controller in communication with the first electric machine and the wheel brakes. The controller is programmed to, during a first time period, control the wheel brakes to apply a braking torque to the wheels of only the second axle in response to brake pedal position exceeding an associated brake pedal threshold while controlling the first electric machine to apply torque to the wheels of only the first axle to intentionally spin the wheels of the first axle in response to accelerator pedal position exceeding an associated accelerator pedal threshold. The controller may be further programmed to control the first electric machine to stop applying torque to the wheels of the first axle in response to detecting movement of the wheels of the second axle. A human-machine interface (HMI) may be configured to activate a performance mode in response to operator input, wherein the controller controls the first electric machine to apply torque to the wheels of the first axle to intentionally spin the wheels of the first axle only while the performance mode is activated. The controller may be further programmed to, during a second time period, control the wheel brakes to apply a braking torque to the wheels of only the first axle while controlling the first electric machine to apply torque to only the wheels of the second axle to intentionally spin the wheels of the second axle in response to the accelerator pedal position exceeding the associated accelerator pedal threshold and the brake pedal position exceeding the associated brake pedal threshold.

In one or more embodiments, a human-machine interface (HMI) is configured to activate a performance mode in response to operator input. The controller is programmed to control the first electric machine to apply torque to the wheels of the second axle to intentionally spin the wheels of the second axle only while the performance mode is activated.

Embodiments may include an electrified vehicle having a second electric machine configured to provide torque to wheels of at least a second axle, wherein the controller is programmed to, during a second time period, control the wheel brakes to apply a braking torque to the wheels of only the first axle while controlling the second electric machine to apply torque to only the wheels of the second axle to intentionally spin the wheels of the second axle in response to the accelerator pedal position exceeding the associated accelerator pedal threshold and the brake pedal position exceeding the associated brake pedal threshold. The second time period may be automatically initiated by the controller in response to expiration of the first time period such that the controller automatically controls spinning of the wheels of the second axle immediately following spinning of the wheels of the first axle.

In one or more embodiments, the controller is programmed to limit wheel speed of the spinning wheels to a maximum spinning threshold speed, and to limit the first time period and the second time period based on tire temperature of the spinning wheels, which may be estimated based on tire characteristics, spinning speed, and road surface characteristics, for example.

Embodiments may also include a method for controlling an electrified vehicle having a first electric machine configured to provide torque to wheels of a first axle and a second electric machine configured to provide torque to wheels of a second axle. The method may include a controller that, in response to accelerator and brake pedal positions exceeding respective thresholds, applies braking torque to the wheels of the first axle while controlling the second electric machine to apply driving torque to the wheels of the second axle to intentionally spin the wheels of the second axle. The method may also include applying braking torque to the wheels of the second axle while controlling the first electric machine to apply driving torque to the wheels of the first axle to intentionally spin the wheels of the first axle. Controlling the first electric machine and the second electric machine to apply driving torque to spin the wheels of the first and second axles, respectively, may be performed only while a track mode or similar operating mode or feature is activated. The method may include controlling the first and second electric machines to limit associated wheel spin speed to a corresponding maximum threshold spin speed and time period to avoid tire damage associated with overheating of the tires. Controlling the first and second electric machines may include applying driving torque for only a predetermined time based on resulting estimated tire temperature.

In one or more embodiments, the method may include receiving input from a human-machine interface (HMI) indicative of selection of a wheel spin operating mode, track mode, tire heating feature, closed-course feature, etc. The method may also include reducing the driving torque applied by the second electric machine to zero or near zero in response to wheel speed or rotation of the wheels of the first axle exceeding an associated threshold while applying the braking torque to the wheels of the first axle. The method may also include reducing the driving torque applied by the first electric machine to zero or near zero in response to wheel speed or rotation of the wheels of the second axle exceeding an associated threshold while applying the braking torque to the wheels of the second axle.

A system according to one or more embodiments of the disclosure may include a first electric machine configured to provide propulsive torque to wheels of a first axle, a second electric machine configured to provide propulsive torque to wheels of a second axle, an electric energy store configured to power the first and second electric machines, a braking system configured to apply a braking torque to the wheels of the first and second axles, a human-machine interface (HMI) configured to receive input from, and provide output to, a vehicle operator, and a controller in communication with the first and second electric machines, the braking system, and the HMI. The controller is programmed to, in response to activation of a tire heating selection via the HMI and concurrent depression of an accelerator pedal and a brake pedal: command the braking system to apply braking torque to the wheels of the first axle while commanding the second electric machine to apply driving torque to the wheels of the second axle to intentionally spin the wheels of the second axle at a predetermined maximum speed during a first time period; and after expiration of the first time period, command the braking system to release braking torque to the wheels of the first axle and apply braking torque to the wheels of the second axle while commanding the first electric machine to apply driving torque to wheels of the first axle to intentionally spin the wheels of the first axle at a predetermined maximum speed during a second time period. The controller may be further programmed to stop applying driving torque to the wheels of the second axle in response to the wheels of the first axle rotating during the first period. The controller may also be further programmed to stop applying driving torque to the wheels of the first axle in response to the wheels of the second axle rotating during the second period. The controller may also be further programmed to detect concurrent depression of the accelerator pedal and the brake pedal in response to accelerator pedal position exceeding a first threshold and brake pedal position exceeding a second threshold, wherein the first threshold is higher than the second threshold.

One or more embodiments according to the disclosure may provide associated advantages. For example, various all-wheel drive (AWD) vehicles do not have the capability to spin tires on dry pavement because torque is distributed over all four wheels. However, selectively spinning the tires heats the tires quickly, enabling greater traction and faster 0-60 mph and ¼ mile or equivalent performance metrics. While conventional internal combustion engine vehicles may have the ability to manually control tire spinning and associated tire heating, electrified vehicle controls typically control torque to prevent wheel spin. As electrified vehicles become accepted as high-performance vehicles for various closed-course or track applications, wheel spinning for visual demonstration and/or tire heating to improve traction according to embodiment of the present disclosure provide a desirable and distinguishable feature. Various embodiments according to the disclosure control an electrified AWD (or eAWD) vehicle having independent front/rear power sources to perform sequential front then rear (or rear then front) axle wheel spinning or "burnouts". In various embodiments, a vehicle controller with this feature activated holds the front brakes while commanding a large torque to the rear axle to perform a burnout, and then issues the opposite commands to provide a large torque to the front axle while holding the rear brakes to perform a burnout on the front axle. In this way, all four tires are hot and ready to provide maximum traction. This feature may be achievable with existing hardware in various vehicles via a software or programming update. The feature may be provided on electrified vehicles that include a single electric machine that has controlled torque distribution to the front and rear axles, two electric machines (once for each axle), or an electric machine for each wheel.

DETAILED DESCRIPTION

Embodiments of the present disclosure are described herein. It is to be understood, however, that the disclosed embodiments are merely examples and other embodiments can take various and alternative forms. The figures are not necessarily to scale; some features could be exaggerated or minimized to show details of particular components. Therefore, specific structural and functional details disclosed herein are not to be interpreted as limiting, but merely as a representative basis for teaching one skilled in the art to variously employ the claimed subject matter. As those of ordinary skill in the art will understand, various features illustrated and described with reference to any one of the figures can be combined with features illustrated in one or more other figures to produce embodiments that are not explicitly illustrated or described. The combinations of features illustrated provide representative embodiments for typical applications. Various combinations and modifications of the features consistent with the teachings of this disclosure, however, could be desired for particular applications or implementations.

Figure 1:
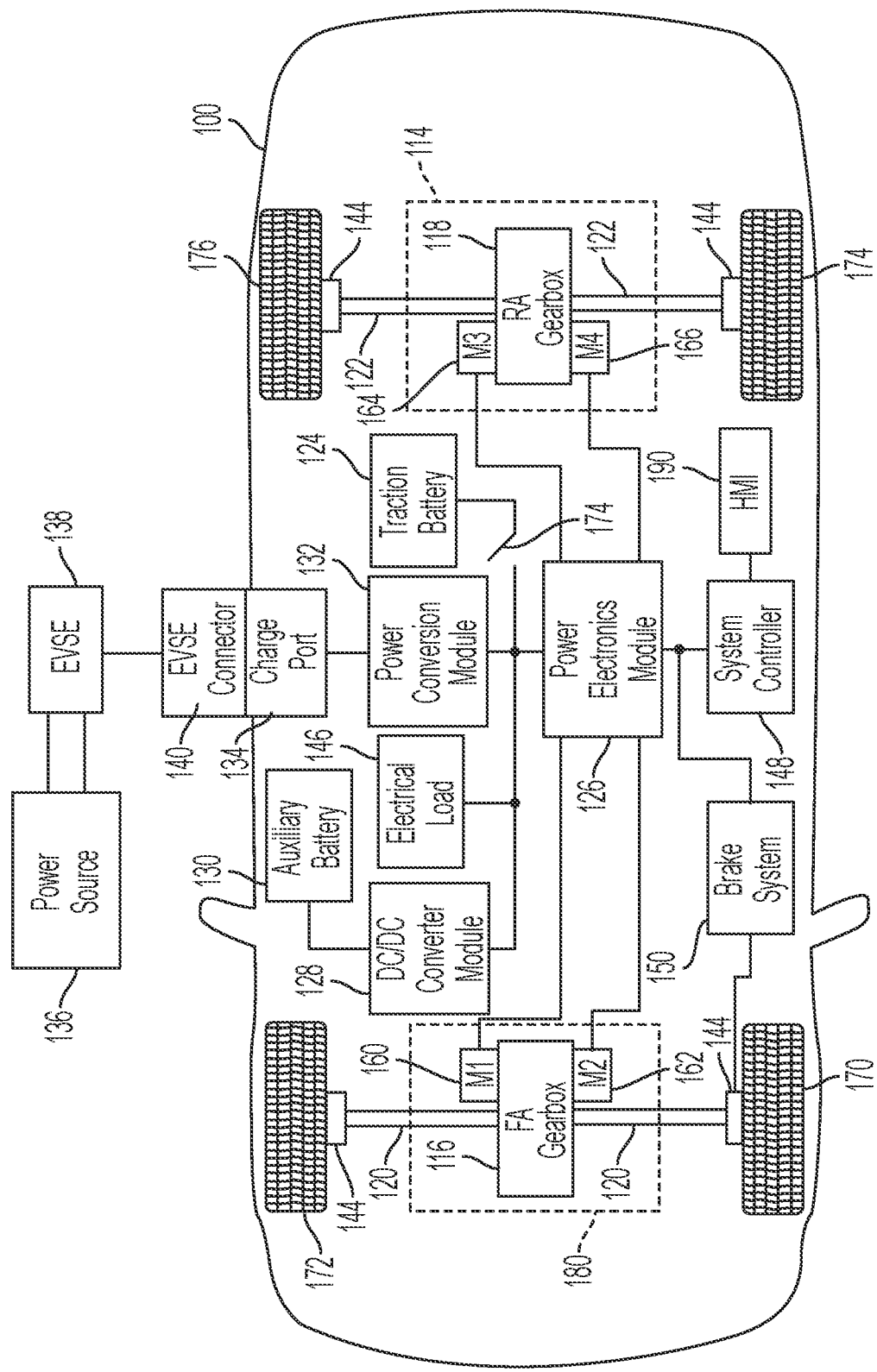
FIG. 1 is a block diagram of a representative electrified vehicle having a selectable mode for tire heating according to one or more embodiments.

FIG. 1 depicts a representative configuration for an electrified vehicle implemented as a battery-electric vehicle (BEV). A BEV 100 may comprise one or more electric machines mechanically coupled to one or more gearboxes to achieve a variety of driving configurations. One or more electric machines coupled to a gearbox may be referred to as a drive unit. A first drive unit 180 may include a first front-axle electric machine 160 and a second front-axle electric machine 162 coupled to a front-axle gearbox 116. The front-axle gearbox 116 may include one or more gears that combine the torque from the first front-axle electric machine 160 and the second front-axle electric machine 162 to provide a torque output to a differential portion of the front-axle gearbox 116. The differential portion of the front-axle gearbox 116 may be mechanically coupled to front drive shafts 120 and direct a portion of the torque to a left-side front wheel 170 and a right-side front wheel 172. In other embodiments, a single electric machine may be coupled to a front-axle gearbox to selectively provide driving torque to the associated front wheels 170, 172.

A second drive unit 182 may include a first rear-axle electric machine 164 and a second rear-axle electric machine 166 coupled to a rear-axle gearbox 114. The rear-axle gearbox 114 may include one or more gears that combine the torque from the first rear-axle electric machine 164 and the second rear-axle electric machine 166 to provide a torque output to a differential portion of the rear-axle gearbox 114. The differential portion of the rear-axle gearbox 114 may be mechanically coupled to rear drive shafts 122 and direct a portion of the torque to a left-side rear wheel 174 and a right-side rear wheel 176. In various embodiments, a single electric machine may be coupled to a rear-axle gearbox to selectively provide driving torque to the associated rear wheels 174, 176. In some configurations, the electric machines 160, 162, 164, 166 may be integrated into or near the wheel assemblies.

The electric machines 160, 162, 164, 166 may be capable of operating as a motor or a generator. The electric machines 160, 162, 164, 166 can provide a propulsion or driving torque as well as a stopping, regenerative braking, or holding torque capability. The electric machines 160, 162, 164, 166 may act as generators to recover energy that would normally be lost as heat in a friction braking system including friction brakes 144.

An electrical energy store may be implemented by a traction battery or battery pack 124 that stores energy that can be used by the electric machines 160, 162, 164, 166. The traction battery 124 may provide a high-voltage direct current (DC) output. The traction battery 124 may be electrically coupled to one or more power electronics modules 126. One or more contactors 142 may isolate the traction battery 124 from other components when opened and connect the traction battery 124 to other components when closed. The power electronics module 126 may also be electrically coupled to the electric machines 160, 162, 164, 166 and provides the ability to bi-directionally transfer energy between the traction battery 124 and the electric machines 160, 162, 164, 166. For example, a traction battery 124 may provide a DC voltage while the electric machines 160, 162, 164, 166 may operate with a three-phase alternating current (AC) to function. The power electronics module 126 may convert the DC voltage to a three-phase AC waveform to operate the electric machines 160, 162, 164, 166. In a regenerative mode, the power electronics module 126 may convert the three-phase AC waveform from the electric machines 160, 162, 164, 166 acting as generators to a DC voltage level that is compatible with the traction battery 124.

In addition to providing energy for propulsion, the traction battery 124 may provide energy for other vehicle electrical systems. The vehicle 100 may include a DC/DC converter module 128 that converts the high-voltage DC output of the traction battery 124 to a low-voltage DC supply that is compatible with low-voltage vehicle loads. An output of the DC/DC converter module 128 may be electrically coupled to an auxiliary battery 130 (e.g., 12V battery). The low-voltage systems may be electrically coupled to the auxiliary battery. One or more electrical loads 146 may be coupled to the high-voltage bus. The electrical loads 146 may have an associated controller that operates and controls the electrical loads 146 when appropriate. Examples of electrical loads 146 may be a heating module or an air-conditioning module.

The traction battery 124 may be recharged by an external power source 136. The external power source 136 may be a connection to an electrical outlet. The external power source 136 may be electrically coupled to a charger or electric vehicle supply equipment (EVSE) 138. The external power source 136 may be an electrical power distribution network or grid as provided by an electric utility company. The EVSE 138 may provide circuitry and controls to manage the transfer of energy between the power source 136 and the vehicle 100. The external power source 136 may provide DC or AC electric power to the EVSE 138. The EVSE 138 may have a charge connector 140 for plugging into a charge port 134 of the vehicle 100. The charge port 134 may be any type of port configured to transfer power from the EVSE 138 to the vehicle 100. The charge port 134 may be electrically coupled to a charger or on-board power conversion module 132. The power conversion module 132 may condition the power supplied from the EVSE 138 to provide the proper voltage and current levels to the traction battery 124. The power conversion module 132 may interface with the EVSE 138 to coordinate the delivery of power to the vehicle 100. The EVSE connector 140 may have pins that mate with corresponding recesses of the charge port 134. Alternatively, various components described as being electrically coupled or connected may transfer power using a wireless inductive coupling. An electric energy store may alternatively be implemented by a fuel cell or similar device that converts stored energy into electrical energy.

An electronically controlled braking system 150 includes one or more wheel brakes 144 coupled to the wheels 170, 172, 174, 176 to provide a friction braking torque for slowing and stopping the vehicle 100 and preventing motion of the vehicle 100. Braking or holding torque may also be provided by one or more of the electric machines 160, 162, 164, and 166. The wheel brakes 144 may be hydraulically actuated, electrically actuated, or some combination thereof. The wheel brakes 144 may be a part of a brake system 150. The brake system 150 may include other components to operate the wheel brakes 144. For simplicity, the figure depicts a single connection between the brake system 150 and one of the wheel brakes 144. A connection between the brake system 150 and the other wheel brakes 144 is implied. The brake system connections may be hydraulic and/or electrical. The brake system 150 may include a controller to monitor and coordinate operation of the wheel brakes 144. The brake system 150 may monitor the brake components and control the wheel brakes 144 for vehicle slowing and stopping. The brake system 150 may respond to driver commands and may also operate autonomously to implement features such as stability control. The controller of the brake system 150 may implement a method of applying a requested brake force when requested by another controller or sub-function. As described in greater detail herein, brake system 150 may be controlled in a performance or track mode to apply braking torque to a single axle while allowing driving torque to be applied to the other axle to intentionally spin the associated wheels.

Electronic modules, controllers, and/or processors in the vehicle 100 may communicate via one or more vehicle networks. The vehicle network may include a plurality of channels for communication. One channel of the vehicle network may be a serial bus such as a Controller Area Network (CAN). One of the channels of the vehicle network may include an Ethernet network defined by Institute of Electrical and Electronics Engineers (IEEE) 802 family of standards. Additional channels of the vehicle network may include discrete connections between modules or controllers and associated actuators and sensors and may include power signals from the auxiliary battery 130. Different signals may be transferred over different channels of the vehicle network. For example, video signals may be transferred over a high-speed channel (e.g., Ethernet) while control signals may be transferred over CAN or dedicated connections. The vehicle network may include any hardware and software components that aid in transferring signals and data between modules. The vehicle network is not shown in FIG. 1 but it may be implied that the vehicle network may connect to any electronic module, controller, or processor that is present in the vehicle 100. A vehicle system controller (VSC) 148 may be present to coordinate the operation of the various components including other modules, controllers, and processors.

Although a BEV is depicted, other electrified vehicle technologies and hybrid technologies are possible. For example, the vehicle may be a fuel cell vehicle. The fuel cell vehicle may include a fuel cell as a primary energy source while the traction battery 124 acts as a secondary energy source. The fuel cell vehicle may be a plug-in type that permits recharging of the traction battery 124. The vehicle may be a hybrid vehicle that includes an engine and an electric drive capability. The implementations described herein may be applicable to any vehicles that include an electric drive having multiple one or more electric machines that may be controlled to provide driving torque to a single axle at a time.

In some configurations, the electric machines 160, 162, 164, 166 may each be configured to provide propulsion torque to drive or spin wheels of the vehicle 100. Various combinations of the electric machines 160, 162, 164, 166 are possible. Configurations may be implemented having from one to four electric machines.

For example, the vehicle 100 may be configured to be a rear-wheel drive (RWD) vehicle in which an electric drive unit is coupled to a rear axle of the vehicle. The RWD vehicle may include only the first rear-axle electric machine 164. In some configurations, the RWD vehicle may include the first rear-axle electric machine 164 and the second rear-axle electric machine 166. In the RWD vehicle, the first front-axle electric machine 160, the second front-axle electric machine 162, and the front-axle gearbox 116 may be omitted.

As another example, the vehicle 100 may be configured as a front-wheel drive (FWD) vehicle in which a drivetrain is coupled to a front axle of the vehicle. The FWD vehicle may include only the first front-axle electric machine 160. In some configurations, the FWD vehicle may include the first front-axle electric machine 160 and the second front-axle electric machine 162. In the FWD vehicle, the first rear-axle electric machine 164, the second rear-axle electric machine 166, and the rear-axle gearbox 118 may be omitted.

The vehicle 100 depicted in FIG. 1 may be implemented as an all-wheel drive (AWD) vehicle. In some configurations, the second front-axle electric machine 162 may be omitted (e.g, one electric machine on the front axle and two electric machines on the rear axle). In some configurations, the second rear-axle electric machine 166 may be absent (e.g, one electric machine on the rear axle and two electric machines on the front axle). In some configurations, the second front-axle electric machine 162 and the second rear-axle electric machine 166 may be absent (e.g., only one electric machine per axle). The particular configuration may be selected for desired performance and handling characteristics of the vehicle.

Having an electric drive unit for each of the axles of the electric vehicle allows operation in different operating modes based on conditions as well as providing a sequential wheel spin or "burnout" feature as described herein. For example, at different times, the vehicle may function as a RWD vehicle, a FWD vehicle, and/or an AWD vehicle. Such a powertrain allows performance to be optimized. Stability and acceleration may be improved by selecting a particular mode of operation.

Each of the electric machines 160, 162, 164, 166 may be characterized by a torque-speed relationship. The electric machines coupled to an axle may have different torque-speed relationships. For example, the first front-axle electric machine 160 may have a different torque-speed relationship than the second front-axle electric machine 162. For example, the first front-axle electric machine 160 may be configured to deliver a relatively high torque at low speeds with a lower cutoff speed. The first front-axle electric machine 160 may be useful for launch vehicle 100. The second front-axle electric machine 162 may have a lower torque capability but have a higher cutoff speed. Similar characteristics may be present on the electric machines coupled to the rear axle. In addition, the operating characteristics of the electric machines may differ between axles (e.g., the first front-axle electric machine 160 may have different characteristics than the first rear-axle electric machine 164).

The front-axle gearbox 116 and the rear-axle gearbox 118 may have different gear ratios. The gear ratios of one gearbox may be configured to output high torque at low speeds. The other gearbox may be configured with a gear ratio optimized for highway cruising speeds. As such, the front-axle gearbox 116 and the rear-axle gearbox 116 may have different operating characteristics.

Figure 2A:
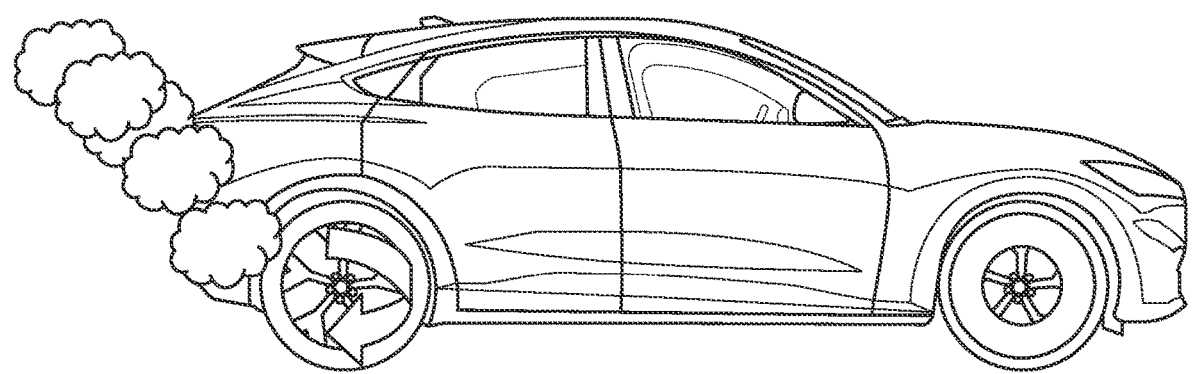
FIGS. 2A and 2B illustrate a sequential peelout or burnout for an electric all-wheel drive (eAWD) vehicle according to one or more embodiments.
Figure 2B:
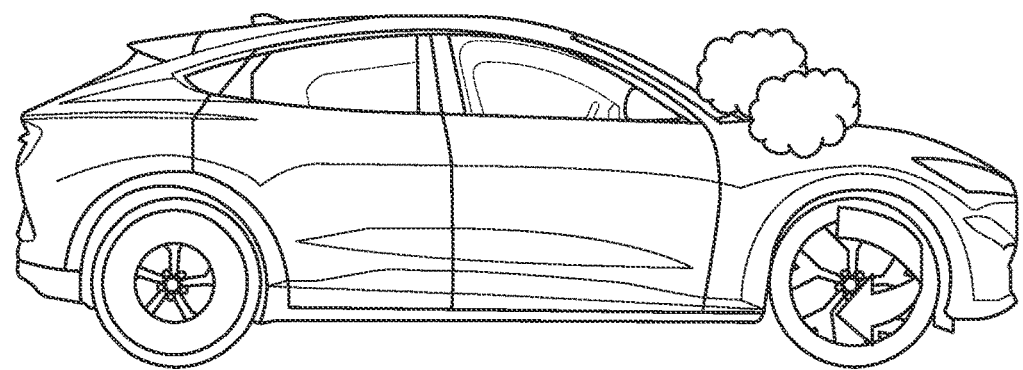

Vehicle 100 may include a human-machine interface (HMI) 190 in communication with system controller 148. HMI 190 may receive operator input to select or activate a track mode, performance mode, or other tire heating mode or feature that automatically controls braking torque of a first axle and driving torque of a second axle to intentionally spin the wheels of the second axle for a first time period as generally illustrated in FIG. 2A. The wheel spin speed and duration of the first time period may be limited based on estimated tire temperature to avoid damaging the tires. Similar control may be performed to automatically control braking torque for wheels of the second axle and driving torque for wheels of the first axle to intentionally spin the wheels of the first axle for a second time period as generally illustrated in FIG. 2B. Likewise, the wheel spin speed and duration of the second period may be limited based on estimated tire temperature to avoid damaging the tires.

Figure 3:
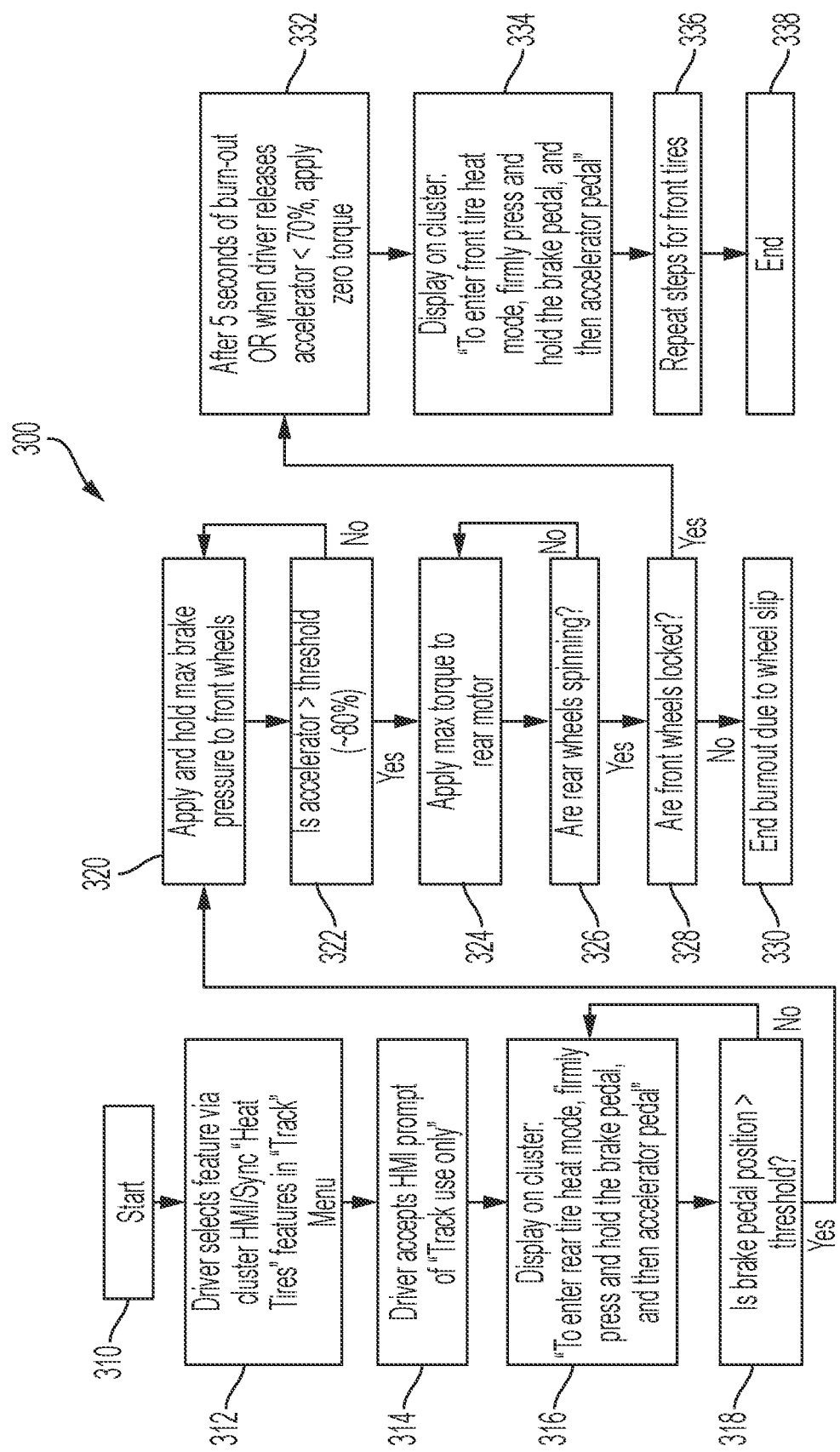
FIG. 3 is a flowchart illustrating operation of a system or method for wheel spinning to heat tires of an electrified vehicle according to one or more embodiments.

FIG. 3 illustrates operation of a system or method for controlling an electrified vehicle to provide intentional wheel spinning and associated tire heating according to a representative embodiment. Control logic or functions performed by one or more controllers, modules, processors, etc. is generally represented in the diagram of FIG. 3. This illustration provides a representative control strategy, algorithm, and/or logic that may be implemented using one or more processing strategies such as event-driven, interrupt-driven, multi-tasking, multi-threading, and the like. As such, various steps or functions illustrated may be performed in the sequence illustrated, in parallel, or in some cases omitted. Although not always explicitly illustrated, one of ordinary skill in the art will recognize that one or more of the illustrated steps or functions may be repeatedly performed. Similarly, the order of processing is not necessarily required to achieve the features and advantages of the claimed subject matter as described herein, but is provided for ease of illustration and description. The control logic may be implemented primarily in software executed by a microprocessor-based vehicle, engine, electric machine, and/or powertrain controllers, generally represented by system controller 148 of FIG. 1. Of course, the control logic may be implemented in software, hardware, or a combination of software and hardware in one or more controllers depending upon the particular application. When implemented in software, the control logic may be provided in one or more non-transitory computer-readable storage devices or media having stored data representing code or instructions executed by a computer to control the vehicle or its subsystems. The computer-readable storage devices or media may include one or more of a number of known physical devices which utilize solid state, electric, magnetic, and/or optical storage to keep executable instructions and associated calibration information, operating variables, and the like.

Representative control logic or algorithm 300 begins at block 310. A driver or other vehicle occupant selects a tire heating feature, track mode, performance mode, or similar feature that provides intentional spinning of vehicle wheels via a vehicle HMI as indicated at 312. The HMI may provide various information to the driver with respect to the feature and request acceptance or acknowledgement of various terms or other conditions associated with the feature to activate the feature as represented at 314. When this feature is activated, the vehicle control may automatically inhibit or disable traction control, AWD torque distribution control, or similar control modes that attempt to reduce or eliminate wheel spin. The HMI may provide instructions for initiating the wheel spinning feature as indicated at 316. In the representative embodiment illustrated, the feature may be initiated after activation by concurrently depressing the brake pedal and accelerator pedal to positions exceeding respective thresholds.

Brake pedal position is detected and compared to a corresponding threshold as indicated at 318. If the brake pedal position does not exceed the threshold, the algorithm returns to block 316. In response to brake pedal position exceeding its associated threshold, such as 50% for example, the controller provides friction braking torque to the wheels of a first axle (front axle in this example) by an associated request or command to the braking system module or controller as indicated at 320. In one or more embodiments, a corresponding electric machine may apply a holding or braking torque to the wheels of the first axle (front axle in this example).

Block 322 monitors accelerator pedal position and provides a corresponding signal or software flag when the accelerator position exceeds a corresponding threshold, such as 80% in this example. If the accelerator pedal position does not exceed the threshold, the algorithm waits for this condition to be satisfied as generally indicated by a return to the previous block 320. In response to the accelerator and brake pedal positions exceeding associated thresholds, the controller controls at least one electric machine to provide a driving or propulsion torque to the second axle (rear axle in this example) as indicated at 324. Driving torque may be increased to intentionally spin the rear wheels as indicated at 326. The driving torque supplied by the associated electric machine may be controlled to limit wheel speed to a predetermined maximum, such as a wheel speed corresponding to 60 mph (100 kmh), for example.

Wheel speed or rotation of wheels that have braking torque applied is monitored as represented by block 328 to assure that the wheels are locked or stationary. If the maximum braking or holding torque is insufficient to lock the wheels or maintain wheel speed below a corresponding threshold, the electric machine is controlled to reduce the driving torque to zero and terminate the mode due to wheel slip as indicated at 330. Otherwise, the controller continues to control the associated electric machine to provide driving torque to the rear wheels for a predetermined time period as indicated at block 332. The predetermined time period may be based on an estimated tire temperature to reduce or eliminate potential tire damage. In the representative embodiment illustrated in FIG. 3, the predetermined time period is five seconds. The driving torque provided by a corresponding electric machine may also be reduced to zero or near zero in response to accelerator pedal position being below an associated threshold, such as 70% as also indicated at block 332.

Depending on the particular implementation, the HMI may display additional instructions for performing a wheel spin for the other axle (front axle in this example) as indicated at 334. Various embodiments may automatically proceed to control of the braking system and electric machine to provide a burnout of the other axle if the entry conditions (such as accelerator pedal and brake pedal positions exceeding corresponding thresholds, no wheel slip, etc.) continue to be satisfied. Alternatively, the operator may be required to provide additional input via the HMI to repeat the sequence for the other axle as represented at 336. The control logic is then repeated for the front axle tires as indicated at 336. Termination or deactivation of the operating mode is generally represented at block 338.

As generally illustrated in FIGS. 1-3, an electrified vehicle 100 includes a first electric machine, such as electric machine 164 or 166 configured to provide torque to wheels 174, 176 of at least a first axle, an energy store 124 coupled to the first electric machine 164, 166, wheel brakes 144 associated with the wheels of the first axle and wheels of a second axle, and a controller 148 in communication with the first electric machine 164, 166 and the wheel brakes 144. The controller 148 is programmed to, during a first time period, control the wheel brakes 144 to apply a braking torque to the wheels 170,172 of only the second axle in response to brake pedal position exceeding an associated brake pedal threshold while controlling the first electric machine 164 or 166 to apply torque to the wheels 174, 176 of the first axle to intentionally spin the wheels of the first axle in response to accelerator pedal position exceeding an associated accelerator pedal threshold 318. Controller 148 may be further programmed to control the first electric machine 164 or 166 to stop applying torque to the wheels 174, 167 of the first axle in response to detecting movement of the wheels 170, 172 of the second axle as represented at 328. Electrified vehicle 100 may also include a human-machine interface (HMI) 190 configured to activate a performance mode in response to operator input, wherein the controller 148 controls the first electric machine 164 or 166 to apply torque to the wheels 174, 176 of the first axle to intentionally spin the wheels of the first axle only while the performance mode is activated 312, 314.

The processes, methods, or algorithms disclosed herein can be deliverable to/implemented by a processing device, controller, or computer, which can include any existing programmable electronic control unit or dedicated electronic control unit. Similarly, the processes, methods, or algorithms can be stored as data and instructions executable by a controller or computer in many forms including, but not limited to, information stored on various types of non-transitory storage media including information permanently stored on non-writable storage media such as ROM devices and information alterably stored on writeable storage media such as optical, magnetic, or solid state media. The processes, methods, or algorithms can also be implemented in a software executable object. Alternatively, the processes, methods, or algorithms can be embodied in whole or in part using suitable hardware components, such as Application Specific Integrated Circuits (ASICs), Field-Programmable Gate Arrays (FPGAs), state machines, controllers or other hardware components or devices, or a combination of hardware, software, and firmware components.

While representative embodiments are described above, it is not intended that these embodiments describe all possible forms encompassed by the claims. The words used in the specification are words of description rather than limitation, and it is understood that various changes can be made without departing from the claimed subject matter. As previously described, the features of various representative embodiments can be combined to form further embodiments that may not be explicitly described or illustrated. While various embodiments could have been described as providing advantages or being preferred over other embodiments or prior art implementations with respect to one or more desired characteristics, those of ordinary skill in the art recognize that one or more features or characteristics can be compromised to achieve desired overall system attributes, which depend on the specific application and implementation. These attributes may include, but are not limited to cost, strength, durability, life cycle cost, marketability, appearance, packaging, size, serviceability, weight, manufacturability, ease of assembly, etc. As such, embodiments described as less desirable than other embodiments or prior art implementations with respect to one or more characteristics are not necessarily outside the scope of the disclosure or claimed subject matter and may be desirable for particular applications.

What is claimed is:

1. An electrified vehicle comprising:
   a first electric machine configured to provide torque to wheels of at least a first axle;
   an energy store coupled to the first electric machine;
   wheel brakes associated with the wheels of the first axle and wheels of a second axle; and
   a controller in communication with the first electric machine and the wheel brakes, the controller programmed to, during a first time period, control the wheel brakes to apply a braking torque to the wheels of only the second axle in response to brake pedal position exceeding an associated brake pedal threshold while controlling the first electric machine to apply torque to the wheels of the first axle to intentionally spin the wheels of the first axle in response to accelerator pedal position exceeding an associated accelerator pedal threshold, the accelerator pedal threshold being greater than the brake pedal threshold.

2. The electrified vehicle of claim 1 wherein the controller is further programmed to control the first electric machine to stop applying torque to the wheels of the first axle in response to detecting movement of the wheels of the second axle.

3. The electrified vehicle of claim 1 further comprising a human-machine interface (HMI) configured to activate a performance mode in response to operator input, wherein the controller controls the first electric machine to apply torque to the wheels of the first axle to intentionally spin the wheels of the first axle only while the performance mode is activated.

4. The electrified vehicle of claim 1 wherein the controller is further programmed to, during a second time period, control the wheel brakes to apply a braking torque to the wheels of only the first axle while controlling the first electric machine to apply torque to the wheels of the second axle to intentionally spin the wheels of the second axle in response to the accelerator pedal position exceeding the associated accelerator pedal threshold and the brake pedal position exceeding the associated brake pedal threshold.

5. The electrified vehicle of claim 4 further comprising a human-machine interface (HMI) configured to activate a performance mode in response to operator input, wherein the controller controls the first electric machine to apply torque to the wheels of the second axle to intentionally spin the wheels of the second axle only while the performance mode is activated.

6. The electrified vehicle of claim 1 further comprising:
   a second electric machine configured to provide torque to wheels of at least the second axle, wherein the controller is further programmed to, during a second time period, control the wheel brakes to apply a braking torque to the wheels of only the first axle while controlling the second electric machine to apply torque to the wheels of the second axle to intentionally spin the wheels of the second axle in response to the accelerator pedal position exceeding the associated accelerator pedal threshold and the brake pedal position exceeding the associated brake pedal threshold.

7. The electrified vehicle of claim 6 wherein the second time period is automatically initiated by the controller in response to expiration of the first time period such that the controller automatically controls spinning of the wheels of the second axle immediately following spinning of the wheels of the first axle.

8. The electrified vehicle of claim 6 wherein the controller is further programmed to limit wheel speed of the spinning wheels to a maximum spinning threshold speed, and programmed to limit the first time period and the second time period based on tire temperature of the spinning wheels.

9. A method for controlling an electrified vehicle having a first electric machine configured to provide torque to wheels of a first axle and a second electric machine configured to provide torque to wheels of a second axle, the method comprising, by a controller:
   in response to accelerator pedal position exceeding a first threshold and brake pedal positions exceeding a second threshold higher than the first threshold:
   applying braking torque to the wheels of the first axle while controlling the second electric machine to apply driving torque to the wheels of the second axle to intentionally spin the wheels of the second axle.

10. The method of claim 9 further comprising:
    applying braking torque to the wheels of the second axle while controlling the first electric machine to apply driving torque to the wheels of the first axle to intentionally spin the wheels of the first axle.

11. The method of claim 10 wherein controlling the first electric machine and the second electric machine to apply driving torque to spin the wheels of the first and second axles, respectively, is performed only while a track mode is activated.

12. The method of claim 10 wherein controlling the first and second electric machines comprises limiting associated wheel spin speed to a corresponding maximum threshold spin speed.

13. The method of claim 10 wherein controlling the first and second electric machines comprises applying driving torque for a predetermined time based on estimated tire temperature.

14. The method of claim 10 further comprising receiving input from a human-machine interface (HMI) indicative of selection of a wheel spin operating mode.

15. The method of claim 10 further comprising reducing the driving torque applied by the second electric machine to zero in response to wheel speed of the wheels of the first axle exceeding an associated threshold while applying the braking torque to the wheels of the first axle.

16. The method of claim 15 further comprising reducing the driving torque applied by the first electric machine to zero in response to wheel speed of the wheels of the second axle exceeding an associated threshold while applying the braking torque to the wheels of the second axle.

17. A system comprising:
a first electric machine configured to provide propulsive torque to wheels of a first axle;
a second electric machine configured to provide propulsive torque to wheels of a second axle;
an electric energy store configured to power the first and second electric machines;
a braking system configured to apply a braking torque to the wheels of the first and second axles;
a human-machine interface (HMI) configured to receive input from, and provide output to, a vehicle operator; and
a controller in communication with the first and second electric machines, the braking system, and the HMI, the controller programmed to, in response to activation of a tire heating selection via the HMI and concurrent depression of an accelerator pedal to a position exceeding a first threshold and a brake pedal to a position exceeding a second threshold, wherein the first threshold is higher than the second threshold:
command the braking system to apply braking torque to the wheels of the first axle while commanding the second electric machine to apply driving torque to the wheels of the second axle to intentionally spin the wheels of the second axle at a predetermined maximum speed during a first time period; and
after expiration of the first time period, command the braking system to release braking torque to the wheels of the first axle and apply braking torque to the wheels of the second axle while commanding the first electric machine to apply driving torque to wheels of the first axle to intentionally spin the wheels of the first axle at a predetermined maximum speed during a second time period.

18. The system of claim 17 wherein the controller is further programmed to stop applying driving torque to the wheels of the second axle in response to the wheels of the first axle rotating during the first period.

19. The system of claim 18 wherein the controller is further programmed to stop applying driving torque to the wheels of the first axle in response to the wheels of the second axle rotating during the second period.

20. The system of claim 19 wherein the controller is further programmed to detect concurrent depression of the accelerator pedal and the brake pedal in response to accelerator pedal position exceeding a first threshold of 80% and brake pedal position exceeding a second threshold of 50%, wherein the first threshold is higher than the second threshold.

* * * * *